US010381029B2

United States Patent
Mu et al.

(10) Patent No.: US 10,381,029 B2
(45) Date of Patent: *Aug. 13, 2019

(54) METHOD AND SYSTEM FOR PROVIDING A HAMR WRITER INCLUDING A MULTI-MODE INTERFERENCE DEVICE

(71) Applicant: WESTERN DIGITAL (FREMONT), LLC, Fremont, CA (US)

(72) Inventors: Jianwei Mu, Pleasanton, CA (US); Sergei Sochava, Sunnyvale, CA (US); Michael V. Morelli, San Jose, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/923,044

(22) Filed: Mar. 16, 2018

(65) Prior Publication Data

US 2018/0204590 A1 Jul. 19, 2018

Related U.S. Application Data

(63) Continuation of application No. 14/936,967, filed on Nov. 10, 2015, now Pat. No. 9,953,670.

(51) Int. Cl.
*G11B 5/60* (2006.01)
*G11B 5/48* (2006.01)
(Continued)

(52) U.S. Cl.
CPC ............ *G11B 5/4866* (2013.01); *G11B 5/127* (2013.01); *G11B 5/6088* (2013.01); *G11B 5/012* (2013.01); *G11B 2005/0021* (2013.01)

(58) Field of Classification Search
None
See application file for complete search history.

(56) References Cited

U.S. PATENT DOCUMENTS 6,016,290 A 1/2000 Chen et al.
6,018,441 A 1/2000 Wu et al.
(Continued)

FOREIGN PATENT DOCUMENTS

EP 2 183 625 A1 2/2013

OTHER PUBLICATIONS

Besse, et al., "New 2/spl times/2 and 1/spl times/3 multimode interference couplers with free selection of power splitting ratios," Journal of Lightwave Technology, Oct. 1996, pp. 2286-2293, vol. 14, Issue 10.

(Continued)

*Primary Examiner* — Brian M Butcher
(74) *Attorney, Agent, or Firm* — Foley & Lardner LLP

(57) ABSTRACT

A heat-assisted magnetic recording (HAMR) write apparatus includes a laser for providing energy and resides in proximity to a media during use. The HAMR write apparatus includes a write pole that writes to a region of the media, coil(s) for energizing the write pole and a waveguide optically coupled with the laser. The waveguide includes at least one multi-mode interference (MMI) device. The MMI device has at least one input, a plurality of outputs, a propagation section and a multi-mode interference (MMI) section. Energy from the laser propagates through the propagation section before the MMI section. The propagation section expands the energy from the laser to a plurality of modes. A first portion of the outputs is output from the propagation section. The MMI section is between the propagation section and a second portion of the plurality of outputs.

20 Claims, 6 Drawing Sheets

(51) Int. Cl.
*G11B 5/127* (2006.01)
*G11B 5/00* (2006.01)
*G11B 5/012* (2006.01)

(56) References Cited

U.S. PATENT DOCUMENTS

| | | | |
|---|---|---|---|
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,236,784 B1 | 5/2001 | Ido |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank et al. |
| 6,304,414 B1 | 10/2001 | Crue et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank et al. |
| 6,417,998 B1 | 7/2002 | Crue et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue et al. |
| 6,466,404 B1 | 10/2002 | Crue et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |

(56) References Cited

U.S. PATENT DOCUMENTS

| | | |
|---|---|---|
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |

(56) References Cited

U.S. PATENT DOCUMENTS

| | | |
|---|---|---|
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,668 B2 | 2/2009 | Piraino |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,840,108 B2 | 11/2010 | Miyadera et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,134,802 B2 | 3/2012 | Bai et al. |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |

(56) References Cited

U.S. PATENT DOCUMENTS

| | | |
|---|---|---|
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 9,052,534 B2 | 6/2015 | Sudo et al. |
| 9,075,192 B2 | 7/2015 | Adams |
| 9,953,670 B1 * | 4/2018 | Mu ............ G11B 5/4866 |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |
| 2015/0131415 A1 | 5/2015 | Peng |
| 2015/0243304 A1 * | 8/2015 | Wan ............ G11B 5/314 |
| | | 216/24 |

(56) References Cited

U.S. PATENT DOCUMENTS

OTHER PUBLICATIONS

Feng, et al., "Waveguide couplers with new power splitting ratios made possible by cascading of short multimode interference sections," Optics Express, 2007, p. 1588, vol. 15, Issue 4.

Levy, et al., "A multimode interference-based variable power splitter in GaAs—AlGaAs," IEEE Photonics Technology Letters, Oct. 1997, p. 1373-1375, vol. 9, Issue 10.

Non-Final Rejection Office Action in U.S. Appl. No. 14/936,967 dated Jul. 25, 2017 (9 pages).

Notice of Allowance in U.S. Appl. No. 14/936,967 dated Jan. 11, 2018 (8 pages).

\* cited by examiner

METHOD AND SYSTEM FOR PROVIDING A HAMR WRITER INCLUDING A MULTI-MODE INTERFERENCE DEVICE

CROSS-REFERENCE TO RELATED PATENT APPLICATIONS

This application is a continuation application of U.S. patent application Ser. No. 14/936,967, filed on Nov. 10, 2015, the entirety of which is incorporated by reference herein.

BACKGROUND

Conventional heat assisted magnetic recording (HAMR) utilizes a laser in a conjunction with magnetic recording technology to write to magnetic media in a disk drive. Light is provided from a laser to a waveguide in a HAMR writer fabricated on a slider. The waveguide may be an interference waveguide (IWG) which includes multiple arms. The light travels through the waveguide toward the ABS and is split between the arms of the waveguide. The light is recombined in proximity to a near-field transducer (NFT). Light from the waveguide is coupled in to the NFT. The NFT couples light into the media at a spot size smaller than the optical diffraction limit, heating a region of the media. Coils in the apparatus energize the main pole to magnetically write to a portion of the media heated by the spot size at a relatively modest field. Thus, data may be written to the media.

In order for HAMR writers to function as desired, not only is sufficient energy required to be delivered to heat the media, but the functioning of various components desired to be monitored. For example, the waveguide may be desired to be tapped in order to monitor the power from the laser that is delivered to the waveguide. Tapping typically involves placing a tapping waveguide in proximity to the waveguide. A small amount of energy is coupled out of the waveguide to the tapping waveguide. Particularly as the HAMR transducer is scaled to smaller sizes, the fabrication and, therefore, reliable operation of such optical components may become challenging. Accordingly, what is needed is a mechanism for improving performance and fabrication of the optical components in HAMR magnetic recording.

DETAILED DESCRIPTION

Figure 1:
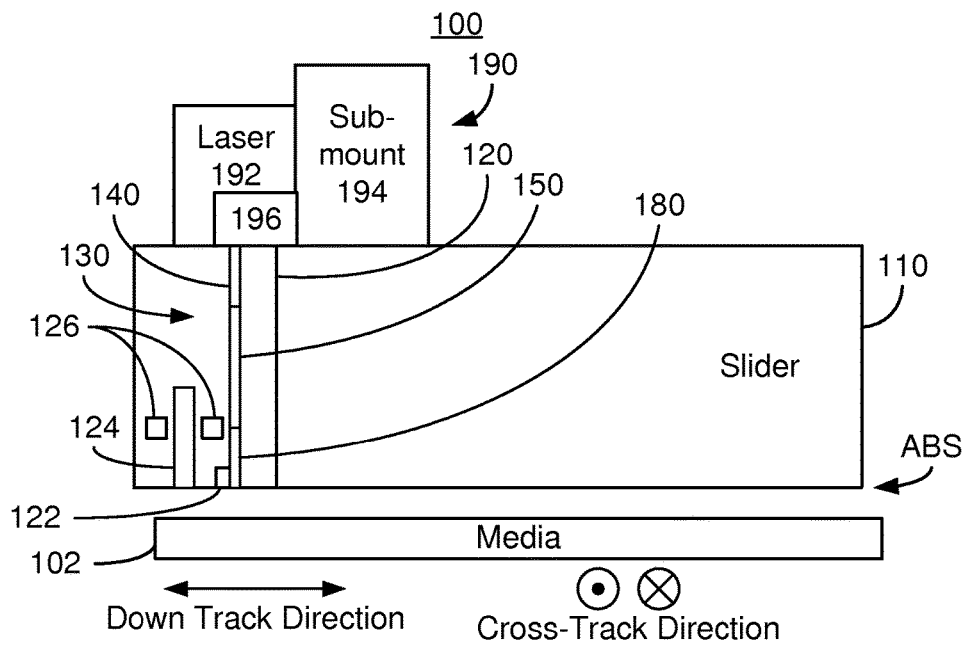
FIG. 1 is a side view of an exemplary embodiment of a HAMR disk drive.
Figure 2:
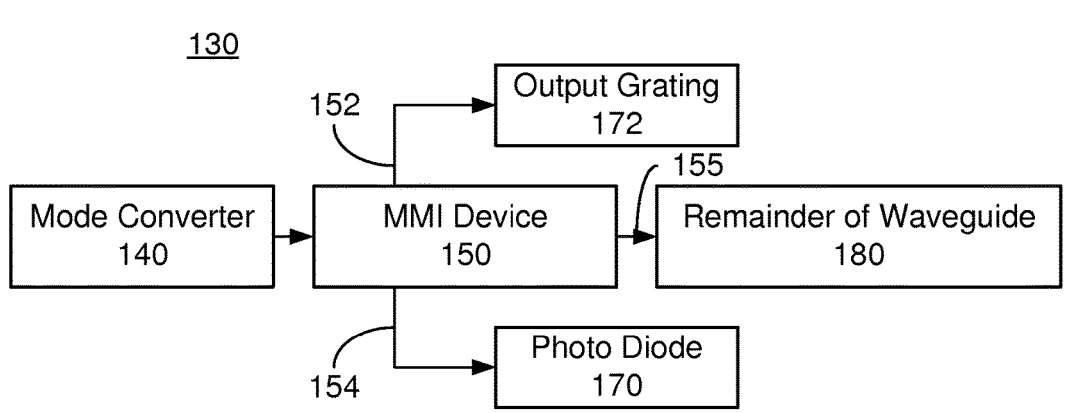
FIG. 2 is a block diagram of certain optical components for an exemplary embodiment of a HAMR write apparatus.

While the various embodiments disclosed are applicable to a variety of data storage devices such as magnetic recording disk drives, solid-state hybrid disk drives, networked storage systems and/or other data storage devices, for the sake of illustration the description below uses disk drives as examples. FIG. 1 depicts an exemplary embodiment of a heat assisted magnetic recording (HAMR) disk drive. 100. FIG. 1 is a side view of the HAMR disk drive 100. FIG. 2 is a block diagram depicting an exemplary embodiment of a waveguide 130 and other optical components used in the HAMR disk drive 100. For clarity, FIGS. 1-2 are not to scale. For simplicity not all portions of the HAMR disk drive 100 are shown. In addition, although the HAMR disk drive 100 is depicted in the context of particular components other and/or different components may be used. For simplicity, only single components are shown. However, multiples of the component(s) and/or their sub-component(s) might be used.

The HAMR disk drive 100 includes media 102, a slider 110, a HAMR write apparatus 120 and a laser subassembly 190. Additional and/or different components may be included in the HAMR disk drive 100. The slider 110, the laser subassembly 190 and HAMR apparatus 120 are generally attached to a suspension (not shown). The HAMR apparatus 120 is fabricated on the slider 110 and includes a media-facing surface. In the disk drive 100, the media-facing surface is also an air-bearing surface (ABS) proximate to the media 102 during use.

In general, the HAMR disk drive 100 includes a write apparatus and a reader. However, for clarity, only the write portion (HAMR write apparatus 120) of the head is shown. The HAMR write apparatus 120 includes optional near-field transducer (NFT) 122, a write pole 124, coil(s) 126, waveguide 130. In other embodiments, different and/or additional components may be used in the HAMR write apparatus 120. The laser subassembly 190 includes a laser 192, a submount 194 and an optional photodetector 196. The laser 192 may be an edge emitting laser diode. The laser subassembly 190 is generally affixed to the back side (the side opposite the ABS) of the slider 110. However, other locations are possible. The submount 194 is a substrate to which the laser 192 may be affixed for mechanical stability, heat sinking, and ease of integration with the slider 110. The photodetector may be used to sample the light provided from the laser 192 to the HAMR apparatus 120. Thus, the laser 192 may be controlled via feedback obtained from the photodetector 196. However, other configurations are possible.

The waveguide 130 is optically coupled with the laser 192 and NFT 122, which resides near the ABS. The waveguide 130 shown may be an interferometric waveguide (IWG). However, other configurations are possible. The waveguide 130 includes an optional mode converter 140, a multi-mode interference (MMI) device 150 and an additional portion 180.

Figure 3:
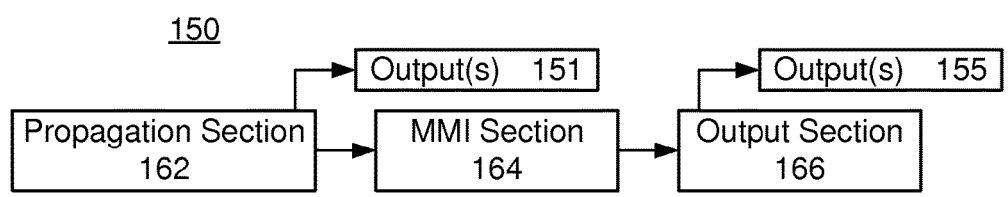
FIG. 3 depicts a block diagram of certain optical components for an exemplary embodiment of a HAMR write apparatus.

The MMI device 150 is also depicted in block diagram form in FIG. 3. FIG. 3 is not to scale. Referring to FIGS. 1-3, light in the waveguide is provided from the mode converter 140 to the MMI device 150 and then to the remainder of the waveguide 180. The mode converter 140 is in proximity to the waveguide entrance and receives optical energy from the laser 192. The mode converter 140 may have a core which tapers such that the exit of the mode converter is narrower than its entrance. The mode converter 140 aids in capturing laser power and transforming the laser mode(s) into waveguide mode(s).

The MMI device 150 includes a propagation section 162, an MMI section 164 and an optional output section 166. The propagation section 162 has one or more outputs 151. In some embodiments, the output(s) 151 include two outputs, 152 and 154, which are more explicitly shown in FIG. 2. Also shown are output(s) 155 of the MMI device 150. Thus, item 155 may refer to a single output or multiple outputs. As depicted in FIG. 2, one output 152 provides light to an optional output grating 172. Another output 154 provides light to an optional photodiode 170. In some embodiments, the photodiode 170 is the same component as the photodiode 196. This output 154 may be used to monitor and control the laser power. The output grating 172 may be used to align the laser 192 during fabrication of the HAMR disk drive 100. For example, light from the output grating 172 may be detected while the laser 192 is aligned to the entrance of the waveguide 130. An increased signal from the output grating 172 indicates a better alignment between the laser 192 and waveguide 130. In some cases the laser subassembly 190 may be fixed in a location corresponding to a maximum in the signal from the output grating 172. In other embodiments, the output grating 172 may be omitted. In such embodiments, the output 152 may be omitted or used for another purpose. The light provided via outputs 152 and 154 is desired to be a small percentage of the light carried by the waveguide 130. In some embodiments, each output 152 and 154 taps out at least two percent and not more than seven percent of the power carried by the MMI device 150. In some such embodiments, nominally five percent of the power is tapped out by each output 152 and 154.

In addition to having outputs 151/152 and 154, the propagation section 162 may be used to expand the energy from the laser to multiple modes. In some embodiments, fifty or more modes may be present in the propagation section 162. In some such embodiments, one hundred or more modes may present. However, in other embodiments, another (larger or smaller) number of modes may be carried by the propagation section 162. Although not shown in FIG. 3, the geometry of the propagation section 162 may be such that the section 162 tapers (narrows in the direction of the exit to the MMI section 164), is untapered, or inversely tapered (widens toward the exit to the MMI section 164)

The MMI section 164 receives light from the propagation section 162. In the MMI section, multiple modes undergo interference. Because the modes traversing the MMI section 164 are interfering, within the MMI section 164 there may be maxima and minima. The outputs are coupled where the appropriate number of maxima are located. The length of the MMI section 164 in the direction of transmission of light may be configured depending upon the number of outputs desired. In general, there will be more maxima closer to the propagation section 162. Thus, if a single output 155 is desired, the MMI section 164 may be longer than if two outputs 155 are desired. Although not shown in FIG. 3, the geometry of the MMI section 164 may be such that the MMI section 164 tapers (narrows in the direction of the exit to the output section 166), is untapered, or inversely tapers (widens toward the exit to the output section 166). A tapered MMI section 164 may allow for the locations of the maxima to be closer to the propagation section 162. Thus, the MMI section 164 may be shorter. In addition, note that although interference is only described for the MMI section 164, it is understood that there is some interference in the other section(s) 162 and 166. However, the majority of the interference occurs in the MMI section 164.

The optional output section 166 is the region to which the output(s) 155 are connected. If the output section 166 is omitted, then the output(s) 155 may be coupled directly to the MMI section 164. The output section 166 may also be tapered, untapered or inversely tapered. If the waveguide 130 is desired to be an IWG, then multiple outputs 155 may be used. In such a case, the remainder of the waveguide 180 includes multiple arms. Alternatively, a single output 155 may be used if only one output is desired or if a separate power splitter is desired to be used. The output(s) 155 provides the remainder of the light carried by the MMI device 150 to the remainder 180 of the waveguide 130. Because the outputs 152 and 154 each couple out at least two percent and not more than seven percent of the power carried by the MMI device 150, the output(s) 155 may carry at least ninety-three percent and not more than ninety-eight percent of the power carried by the MMI device 150 (ignoring losses in transmission through the MMI device 150). Thus, there is an uneven split in the light provided by the outputs 151/152 and 154 and 155.

The output(s) 155 of the MMI device 150 are coupled to the remainder of the waveguide 150. As discussed above, in some embodiments, the remainder 180 of the waveguide 130 includes multiple arms of the IWG 130. Alternatively, the remainder 180 may include a single arm. The remainder 180 of the waveguide 130 is optically coupled with the NFT 122.

In operation, the light from the laser 192 is transmitted to the waveguide 130. The light is concentrated by the mode converter 140. Light is then transmitted to the MMI device 150. Thus, light may enter the propagation section 162 and be expanded out to a larger number of modes. In addition, a small amount of light may be tapped out through outputs 151/152 and 154. Light from the propagation section 162 traverses the MMI section 164, undergoing interference. The light may then be provided to the output section 166 for coupling to the remainder 180 of the waveguide 130 via output(s) 155. The light energy is then transferred to the NFT 122, which heats a small region of the media 102. The coil(s) 126 are energized and the pole 124 used to magnetically write to the media 102.

The HAMR disk drive 100 may have improved performance and fabrication. The waveguide 130 using the MMI device 150 may be simpler to fabricate and have higher fabrication tolerances than alternative waveguide splitters because of the geometry of the MMI device 150. The waveguide 150 may also occupy less space on the HAMR write apparatus. The MMI device 150 and thus the waveguide 130 may also be more insensitive to uncertainties in wavelength. Because fabrication is facilitated, it is believed that yield and performance of the fabricated devices may be enhanced. Consequently, formation and performance of the HAMR disk drive 100 may be improved.

Figure 4:
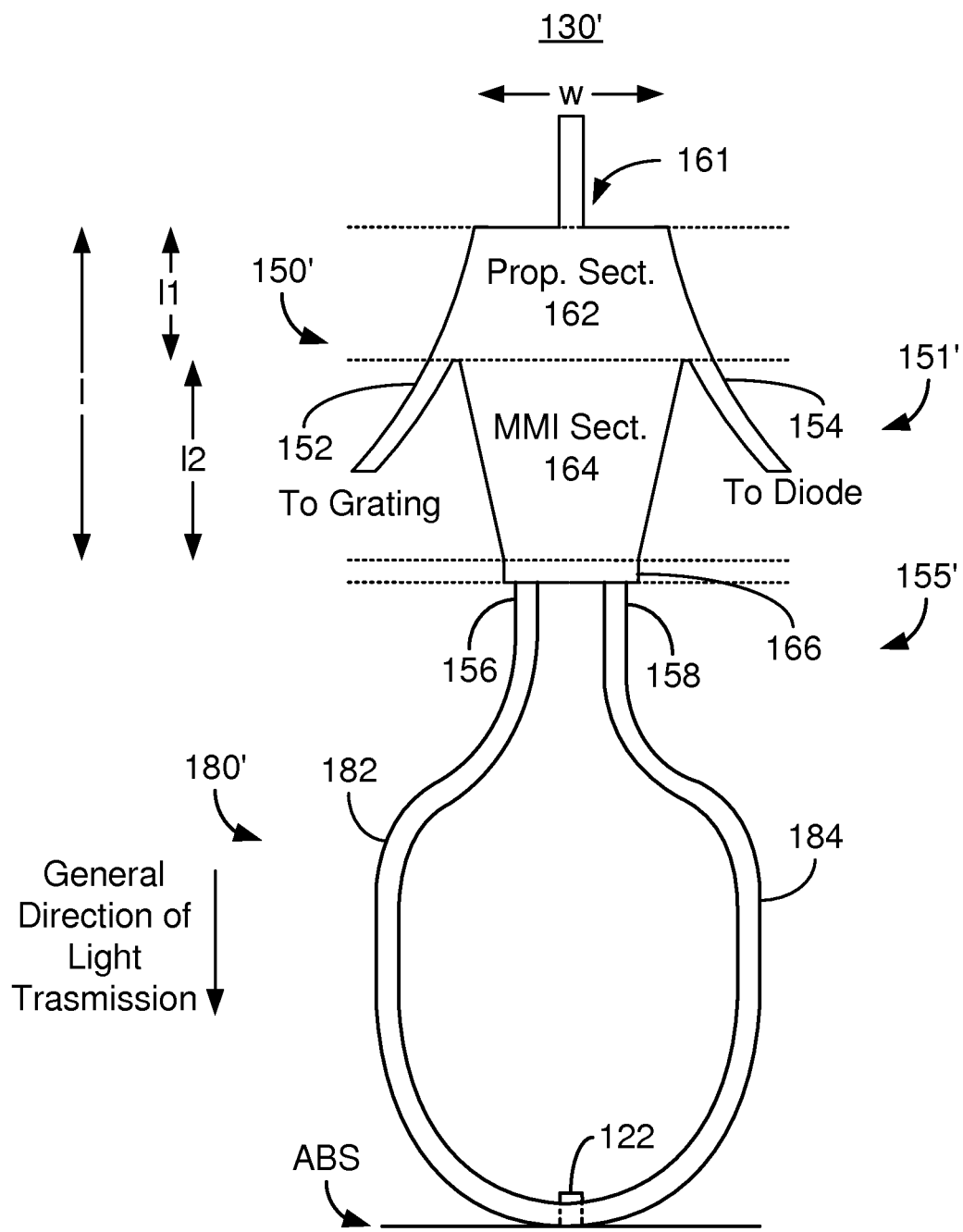
FIG. 4 depicts an exemplary embodiment of optical components for a HAMR write apparatus.

FIG. 4 is a diagram depicting another embodiment of optical components including a waveguide 130' usable in the HAMR write apparatus 120. For clarity, FIG. 4 is not to scale. The waveguide 130' is described in the context of the HAMR disk drive 100 but could be used in another data storage device. The waveguide 130' is analogous to the waveguide 130. Thus, analogous portions of the waveguide 130' are labeled similarly to the waveguide 130. The waveguide 130' includes a mode converter (not shown), MMI device 150', outputs 151' and 155' and remaining portion 180' that are analogous to the MMI device 150, outputs 151 and 155 and remaining portion 180.

The MMI device 150' includes a propagation section 162, an MMI section 164 and an output section 166. The sections 162, 164 and 166 of the MMI device 150' are shown as divided by dashed lines. For example one dashed line indicates the exit of the propagation section 162 and the entrance of the MMI section 164. Another dashed line indicates the exit of the MMI section 164 and the entrance of the output section 166. The functions of the sections 162, 164 and 166 are analogous to those described above for the MMI device 150. The propagation section 162 has entrance 161. Outputs 152 and 154 are connected to the propagation section 162. In the embodiment shown in FIG. 4, the propagation section 162 is inversely tapered. As a result, the mode(s) of the light entering the propagation section 162 may be more rapidly expanded.

The MMI section 164 is tapered while the output section 166 is untapered. In other embodiments, other tapering(s) are possible. As discussed above, the majority of the interference between multiple modes occurs in the MMI section 164, which may have standing nodes and maxima, For the waveguide 130', two outputs 156 and 158 are the output(s) 155'. The tapered MMI section 164 may allow for more rapid convergence of the interference pattern within the MMI section 164 to the desired number of maxima. Thus, the output section 166 and outputs 156 and 158 may be placed closer to the entrance 161 of the MMI device 150. The output section 166 may be untapered for more predictable coupling of the light to the outputs 156 and 158.

Because of the tapers of the sections 162, 164 and 166, the length, l, of the MMI device 150 may be reduced. Note that the length l is not depicted as including the output section because the desired maxima are formed in the MMI section 164. In some embodiments, l is desired not to exceed twenty micrometers. Because it is tapered (narrows toward the exit), the length l2 of the MMI section 164 may be shortened. In some embodiments, l2 does not exceed fifteen micrometers. In some embodiments, the MMI section 164 is at least two micrometers and not more than three micrometers wide. In some such embodiments, the MMI section 164 is at least 2.5 micrometers and not more than 2.8 micrometers. However, other widths and lengths are possible. The length, l1 of the propagation section may be less than l2. However, the propagation section may have a desired maximum width, w, based on the space available and number of modes desired to be coupled in. In some embodiments, w is desired not to exceed four micrometers. In designing the MMI device 150', the lengths, l and l2, desired are generally fixed and the widths configured based on these lengths.

The outputs 156 and 158 are connected to the remainder 180' of the waveguide 130'. The outputs 156 and 158 may be located at the positions of two intensity maxima of the interference pattern for the MMI section 164. The separation between the outputs 156 and 158 may be relatively large. In some embodiments, the separation between the outputs 156 and 158 is at least five hundred nanometers and not more than 2 micrometers.

The remainder 180' of the waveguide 130' is an IWG 180'. Thus, two arms 182 and 184 are shown. Because the MMI device 150' is coupled to an IWG 180', the light carried by the outputs 156 and 158 may be desired to be matched in power and phase. The light in the arms 182 and 184 may be recombined and coupled out to the NFT 122.

A HAMR write apparatus using the waveguide 130' may have improved fabrication and performance. As can be seen in FIG. 4, the geometry of the MMI device 150' is relatively simple. For example, the outputs 152 and 154 may be relatively simple to fabricate in comparison to other tapping waveguides, which require narrow waveguides to be in close proximity over a particular length in order to couple out a desired portion of the energy. Similarly, the outputs 156 and 158 may be placed further apart than a conventional power splitter. As a result, the relatively narrow outputs 156 and 158 may be easier to fabricate. Further, the process margins for the structures 150', 152, 154, 156, 158, 161, 162, 164 and 166 may be greater. Because the MMI device 150' may be more readily fabricated, the yield and performance of the waveguide 130' may be improved. In addition, the MMI device 150' and thus the waveguide 130' may be more tolerant to uncertainties in wavelength. Consequently, manufacturing and performance of data storage devices using the waveguide 130', such as the HAMR disk drive 100, may be improved.

Figure 5:
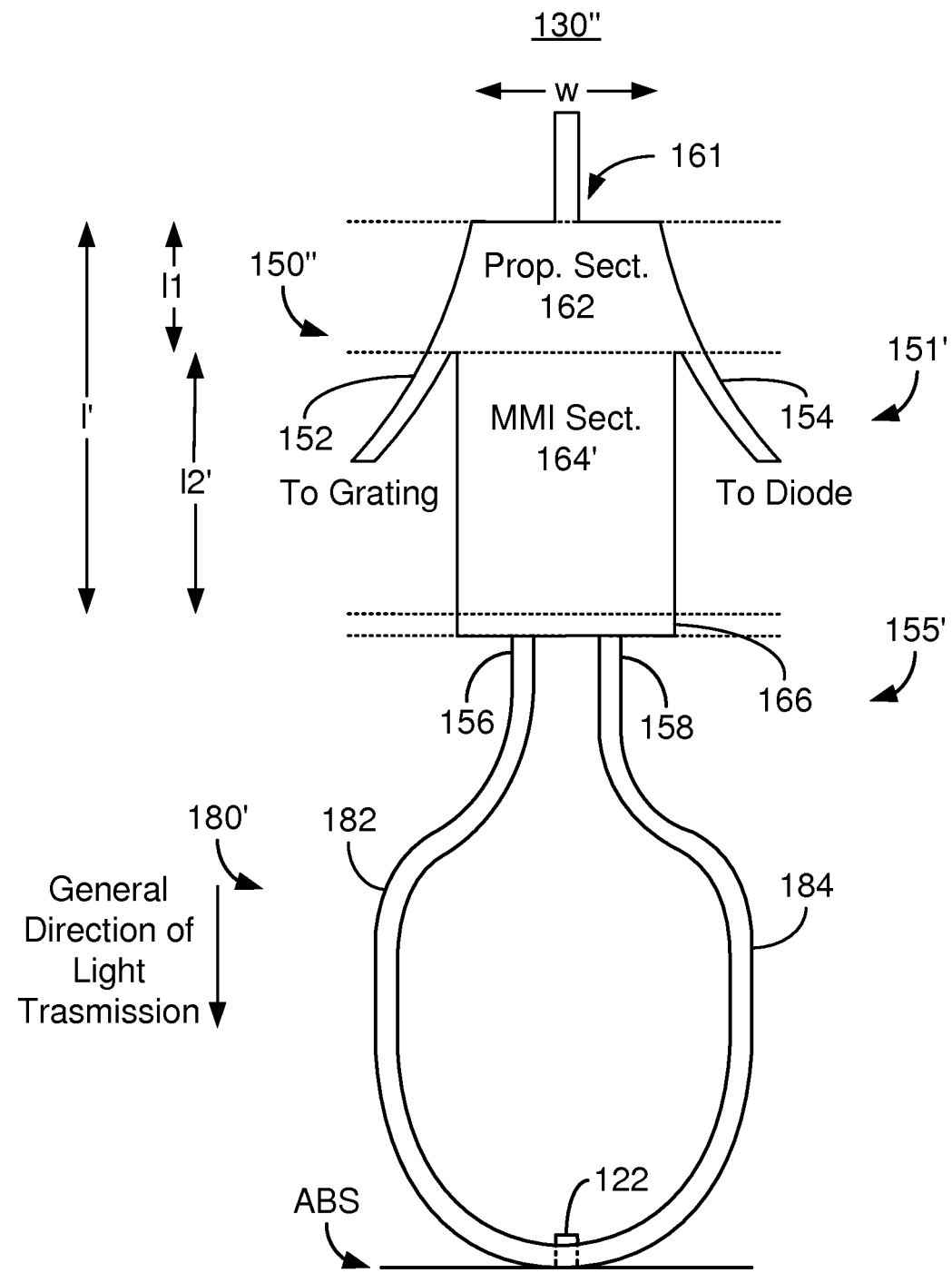
FIG. 5 depicts an exemplary embodiment of optical components for a HAMR write apparatus.

FIG. 5 is a diagram depicting another embodiment of optical components including a waveguide 130" usable in the HAMR write apparatus 120. For clarity, FIG. 5 is not to scale. The waveguide 130" is described in the context of the HAMR disk drive 100 but could be used. in another data storage device. The waveguide 130' is analogous to the waveguides 130 and 130'. Thus, analogous portions of the waveguide 130" are labeled similarly to the waveguides 130 and 130'. The waveguide 130" includes a mode converter (not shown), MMI device 150", outputs 151' and 155' and remaining portion 180' that are analogous to the MMI device 150/150', outputs 151/151' and 155/155' and remaining portion 180/180'.

The MMI device 150" includes a propagation section 162, an MMI section 164' and an output section 166. The sections 162, 164' and 166 of the MMI device 150" are shown as divided by dashed lines. The functions of the sections 162, 164' and 166 are analogous to those described above for the MMI devices 150 and 150'. The propagation section 162 has entrance 161. Outputs 152 and 154 are connected to the propagation section. In the embodiment shown in FIG. 5, the propagation section 162 is inversely tapered. As a result, the modes of the light entering the propagation section 162 may be more rapidly expanded.

The MMI section 164' and the output section 166 are both untapered. As a result, the length, l', of the MMI device 150" may be increased over that shown for the MMI device 150/150'. Because it is not tapered, the length l2' of the MMI section 164' may be increased. Thus, even though the length l1 may remain the same, the length l' may be increased over l for the waveguide 130. However, some or all of the remaining benefits of the waveguide 130/130' may be achieved.

A HAMR write apparatus using the waveguide 130" may have improved fabrication and performance. As can be seen in FIG. 5, the geometry of the MMI device 150" is relatively simple and analogous to the geometry of the MMI devices 150 and 150'. For example, the outputs 152 and 154 may be relatively simple to fabricate in comparison to other tapping waveguides. Similarly, the outputs 156 and 158 may be placed further apart than a conventional power splitter. As a result, the relatively narrow outputs 156 and 158 may be easier to fabricate. Further, the process margins for the structures 150", 152, 154, 156, 158, 161, 162, 164' and 166 may be greater. In addition, the MMI device 150" and thus the waveguide 130" may be more tolerant to uncertainties in wavelength. Because the MMI device 150" may be more readily fabricated, the yield and performance of the waveguide 130" may be improved. Consequently, manufacturing and performance of data storage devices using the waveguide 130", such as the HAMR disk drive 100, may be improved.

Figure 6:
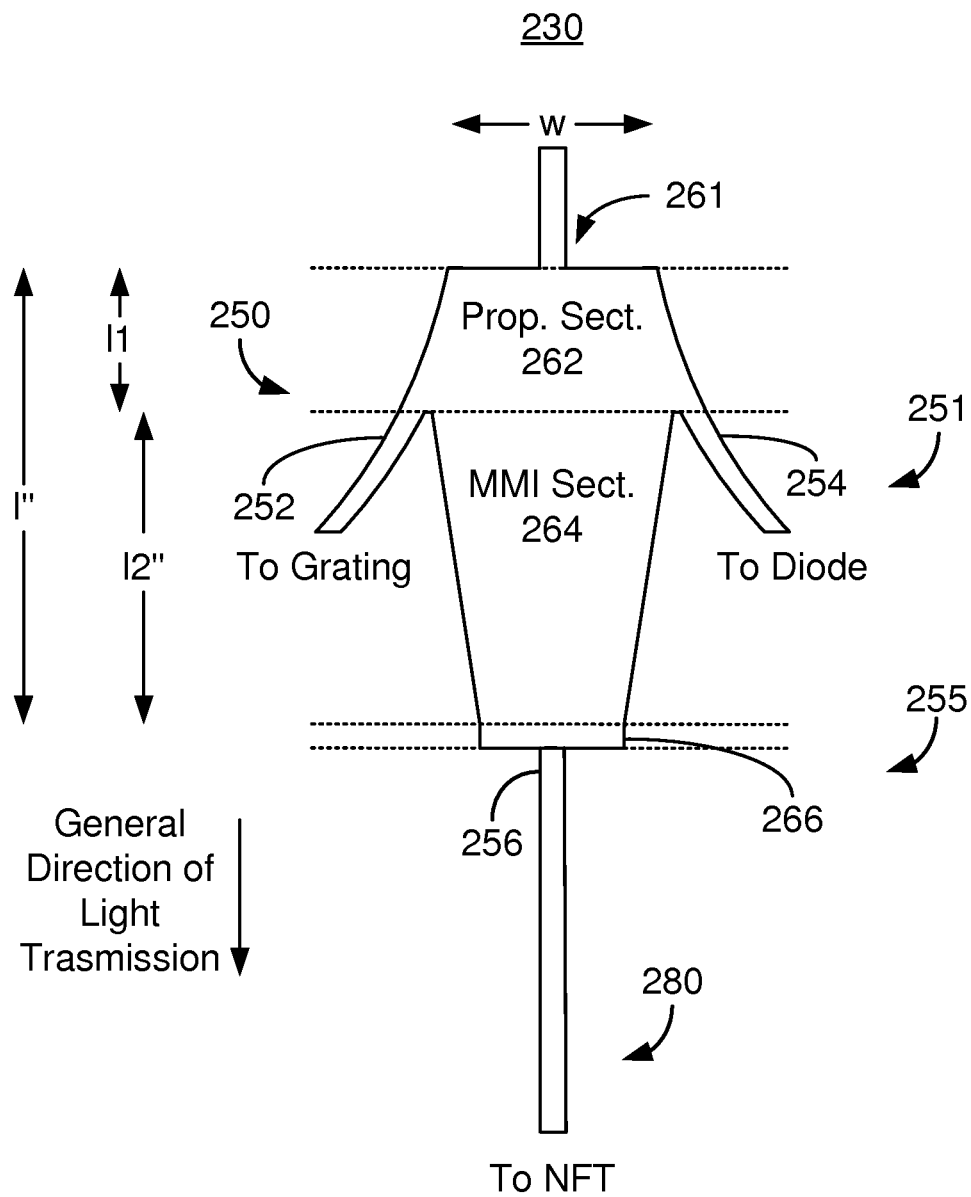
FIG. 6 depicts an exemplary embodiment of optical components for a HAMR write apparatus.

FIG. 6 is a diagram depicting another embodiment of optical components including a waveguide 230 usable in the HAMR write apparatus 120. For clarity, FIG. 6 is not to scale. The waveguide 230 is described in the context of the HAMR disk drive 100 but could be used in another data storage device. The waveguide 230 is analogous to the waveguides 130, 130' and 130". Thus, analogous portions of the waveguide 230 are labeled similarly to the waveguides 130, 130' and 130". The waveguide 230 includes a mode converter (not shown), MMI device 250, outputs 251 and 255 and remaining portion 280 that are analogous to the MMI device 150/150'/150", outputs 151/151' and 155/155' and remaining portion 180/180'.

The MMI device 250 includes a propagation section 262, an MMI section 264 and an output section 266 that are analogous to the propagation section 162, MMI section 164/164' and output section 166. The sections 262, 264 and 266 of the MMI device 250 are shown as divided by dashed lines. The functions of the sections 262, 264 and 266 are analogous to those described above for the MMI devices 150, 150' and 150". The propagation section 262 has entrance 261 and may be used to expand the modes. Outputs 252 and 254 are connected to the propagation section 262. In the embodiment shown in FIG. 6, the propagation section 262 is inversely tapered. As a result, the modes of the light entering the propagation section 262 may be more rapidly expanded. However, in other embodiments, the propagation section 262 may be untapered or tapered.

The MMI section 264 is tapered while the output section 266 is untapered. As a result, the length, l", of the MMI device 250 may be decreased over that for an untapered or inversely tapered MMI device. Stated differently, the sections 262 and 264 are analogous to the sections 162 and 164 depicted in FIG. 4. Because it is tapered (narrows toward the exit), the length l2" of the MMI section 164 may be decreased over an untapered or inversely tapered MMI section. Similarly, in other embodiments, the optional output section 266 may be tapered or inversely tapered.

The MMI device 250 includes a single output 256/255. Thus, the remainder 280 of the waveguide 230 is not an IWG. Instead, a single arm 280 is used. As discussed above, the lengths l" and l2" may depend upon the number of outputs 255/256. This is because the output 255/256 is desired to be located at the position of a single maximum in the interference pattern developed in the MMI section 264. Thus, despite the presence of the taper, the length l2" of the MMI section 264 for a single output 255/256 is generally greater than the length l2 of the tapered MMI section 164 for the dual outputs 155'/156 and 158. However, the length l" of the MMI device 250 may be decreased over that of an MMI device having an untapered MMI section.

A HAMR write apparatus using the waveguide 230 may have improved fabrication and performance. As can be seen in FIG. 6, the geometry of the MMI device 250 is relatively simple and analogous to the geometry of the MMI devices 150, 150' and 150". For example, the outputs 252 and 254 may be relatively simple to fabricate in comparison to other tapping waveguides. Further, the process margins for the structures 250, 252, 254, 261, 262, 264 and 266 may be greater. In addition, the MMI device 250 and thus the waveguide 230 may be more insensitive to uncertainties in wavelength. Because the MMI device 250 may be more readily fabricated, the yield and performance of the waveguide 230 may be improved. Consequently, manufacturing and performance of data storage devices using the waveguide 230, such as the HAMR disk drive 100, may be improved.

Figure 7:
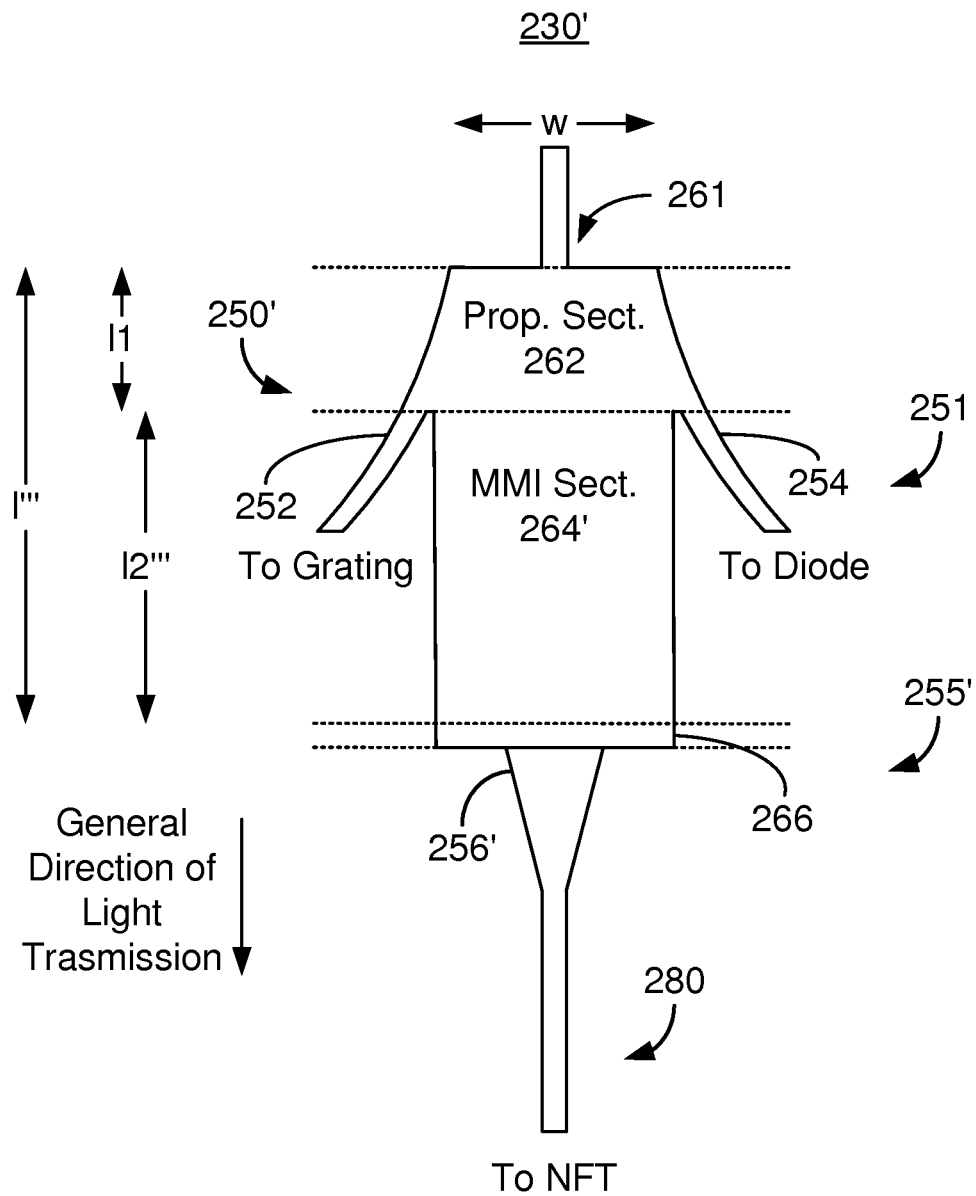
FIG. 7 depicts an exemplary embodiment of optical components for a HAMR write apparatus.

FIG. 7 is a diagram depicting another embodiment of optical components including a waveguide 230' usable in the HAMR write apparatus 120. For clarity, FIG. 7 is not to scale. The waveguide 230' is described in the context of the HAMR disk drive 100 but could be used in another data storage device. The waveguide 230' is analogous to the waveguides 130, 130', 130" and 230. Thus, analogous portions of the waveguide 230' are labeled similarly to the waveguides 130, 130', 130" and 230. The waveguide 230' includes a mode converter (not shown), MMI device 250', outputs 251 and 255' and remaining portion 280 that are analogous to the MMI device 150/150'/150"/250, outputs 151/151'/251 and 155/155'/255 and remaining portion 180/180'/280.

The MMI device 250' includes a propagation section 262, an MMI section 264' and an output section 266 that are analogous to the propagation section 162/262, MMI section 164/164'/264 and output section 166/266. The sections 262, 264' and 266 of the MMI device 250' are shown as divided by dashed lines. The functions of the sections 262, 264' and 266 are analogous to those described above for the MMI devices 150, 150', 150" and 250. The propagation section 262 has entrance 261 and may be used to expand the modes. Outputs 252 and 254 are connected to the propagation section 262. In the embodiment shown in FIG. 7, the propagation section 262 is inversely tapered. As a result, the modes of the light entering the propagation section 262 may be more rapidly expanded. However, in other embodiments, the propagation section 262 may be untapered or tapered.

The MMI section 264' and the output section 266 are both untapered. As a result, the length, l'", of the MMI device 250' may be increased over that shown for the MMI device 250. Because it is not tapered, the length l2'" of the MMI section 264' may be increased. Thus, even though the length l1 may remain the same, the length l'" may be increased.

The MMI device 250' includes a single output 255'/256' coupled with a single arm 280. As discussed above, the lengths l'" and l2'" may depend upon the number of outputs 255'/256'. Because a single output 255'/256' is used, the lengths l'" and l2'" may be increased. In addition, the output 256' is tapered. Thus, fabrication of the output 255'/256' may be facilitated.

A HAMR write apparatus using the waveguide 230 may have improved fabrication and performance. As can be seen in FIG. 7, the geometry of the MMI device 250' is relatively simple and analogous to the geometry of the MMI devices 150, 150', and 150" and 250. Consequently, manufacturing and performance of data storage devices using the waveguide 230', such as the HAMR disk drive 100, may be improved. Thus, the waveguides 130, 130', 230 and 230' are depicted with various features. However, these features may be combined in manners not explicitly disclosed herein and which are not inconsistent with the apparatus and methods described.

Figure 8:
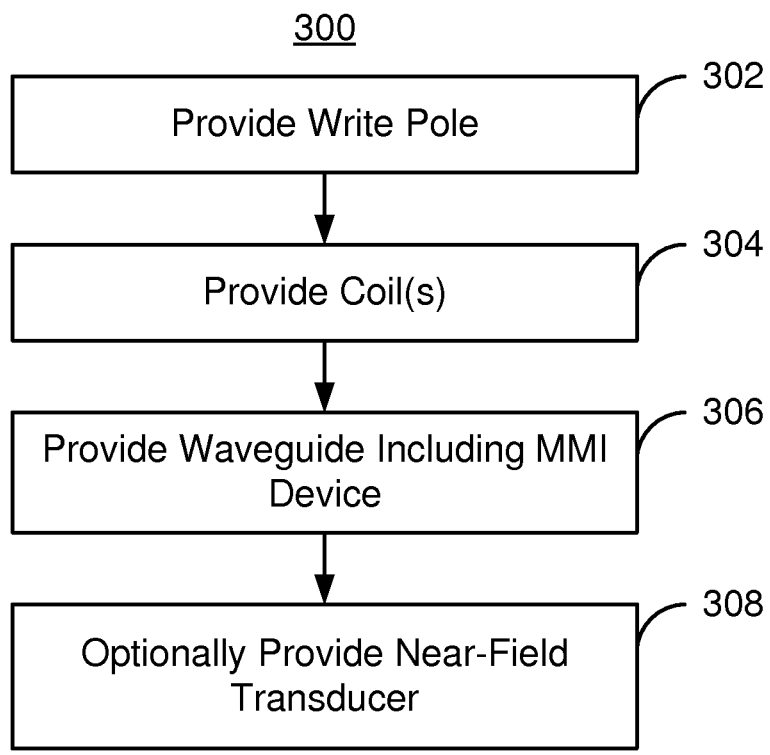
FIG. 8 is a flow chart depicting an exemplary embodiment of a method for fabricating a HAMR write apparatus.

FIG. 8 is a flow chart depicting an exemplary embodiment of a method 300 for fabricating HAMR disk drives having improved optical efficiency. In particular, the method 300 may be used in fabricating a HAMR disk drive 100. For simplicity, some steps may be omitted, performed in another order, interleaved with other steps and/or combined. The method 300 is described in the context of forming a single disk drive 100. However, the method 300 may be used to fabricate multiple disk drives at substantially the same time and/or single or multiple other data storage devices. The method 300 and system are also described in the context of particular components. However, such components may include multiple sub-components that are also manufactured.

The write pole 124 is fabricated, via step 304. Step 304 may include forming top and/or bottom bevels in the pole tip and otherwise shaping the write pole. The coil(s) 126 may be provided, via step 304. The waveguide 130, 130', 230 and/or 230' including the MMI devices 150, 150', 250 and/or 250', respectively, are fabricated, via step 306. Step 306 may include depositing the core layer on a cladding layer, providing a photoresist mask in the desired shape of the core/components of the waveguides 130/130'/230/230', removing the exposed portions of the core layer and depositing another cladding layer. Thus, the optional mode converter, MMI device and remainder of the waveguide may be provided. The NFT may also be provided, via step 308. Fabrication of the apparatus may then be completed.

Thus, using the method 300, the HAMR disk drive 100 and waveguides 130, 130', 230, 230' and/or some combination thereof may be provided. Consequently, the benefits of the waveguides 130, 130', 230, 230' and MMI devices 150, 150', 250 and/or 250' may be achieved.

Figure 9:
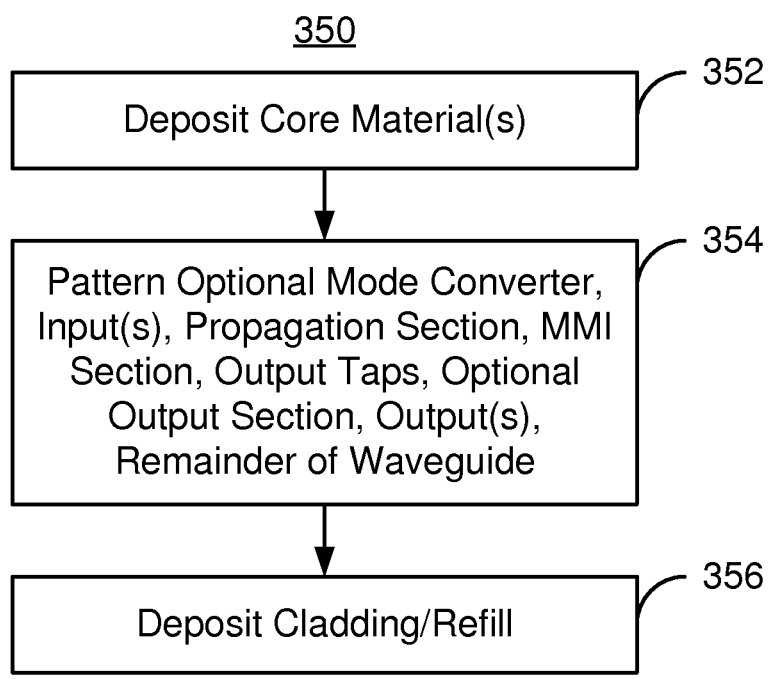
FIG. 9 is a flow chart depicting an exemplary embodiment of a method for fabricating optical components for a HAMR write apparatus.

FIG. 9 is a flow chart depicting an exemplary embodiment of a method 350 for fabricating waveguide including an MMI device. In particular, the method 350 may be used in fabricating the waveguide 130, 130', 230 and/or 230'. For simplicity, some steps may be omitted, performed in another order, interleaved with other steps and/or combined. The method 350 is described in the context of forming the waveguide 130. However, the method 350 may be used to fabricate waveguides at substantially the same time and/or other waveguides. The method 350 and system are also described in the context of particular components. However, such components may include multiple sub-components that are also manufactured.

The materials for the core are deposited, via step 352. Step 352 typically includes depositing higher index of refraction materials, such as tantalum oxide, on a lower index cladding material, such as aluminum oxide or silicon oxide. The core materials are patterned, via step 354. Step 354 may include providing a photoresist mask in the desired shape of the mode converter 140, MMI device 150, outputs 151/151, and remainder 180/180' of the waveguide 150. The exposed portions of the core layer are then removed. Thus, the mode converter 140, MMI device 150, outputs 151/151, and remainder 180/180' of the waveguide 150 are formed. Thus, the geometry of the components and waveguides depicted in FIGS. 1-7 corresponds to this patterned core layer. A cladding layer may then be deposited to refill the regions around the components, via step 356.

Thus, using the method 350, the waveguides 130, 130', 230, 230' and/or some combination thereof may be provided. Consequently, the benefits of the waveguides 130, 130', 230, 230' and MMI devices 150, 150', 250 and/or 250' may be achieved.

What is claimed is:

1. A magnetic write apparatus comprising:
a waveguide configured to direct energy from a light source to a near field transducer, the waveguide comprising a multi-mode interference device comprising a propagation section,
wherein the propagation section receives the energy from the light source via a propagation section entrance; and
wherein the propagation section entrance is narrower than a propagation section exit.

2. The magnetic write apparatus of claim 1, wherein the waveguide further comprises a mode converter configured to receive the energy from the light source and direct the energy to the propagation section entrance.

3. The magnetic write apparatus of claim 1, wherein the waveguide further comprises an additional portion configured to receive an output from the multi-mode interference device and transmit the output to the near field transducer.

4. The magnetic write apparatus of claim 1, wherein an output from the propagation section comprises a first output portion and a second output portion, and wherein the first output portion is transmitted outside the waveguide to control the light source and the second output portion is transmitted to a multi-mode interference section of the multi-mode interference device.

5. The magnetic write apparatus of claim 1, wherein the multi-mode interference device further comprises a multi-mode interference section that receives an output via the propagation section exit, and wherein the multi-mode interference section has a multi-mode interference section entrance that is wider than a multi-mode interference section exit.

6. The magnetic write apparatus of claim 5, wherein a combined length of the propagation section and the multi-mode interference section in a direction of propagation of the energy from the light source to the near field transducer is not more than twenty micrometers.

7. The magnetic write apparatus of claim 5, wherein a length of the propagation section in a direction of propagation of the energy from the light source to the near field transducer is less than a length of the multi-mode interference section in the direction of propagation of the energy.

8. The magnetic write apparatus of claim 5, wherein a width of the multi-mode interference section in a direction perpendicular to a direction of propagation of the energy from the light source to the near field transducer is at least two micrometers and not more than three micrometers.

9. The magnetic write apparatus of claim 1, wherein a width of the propagation section in a direction perpendicular to a direction of propagation of the energy from the light source to the near field transducer is not more than four micrometers.

10. The magnetic write apparatus of claim 1, wherein the multi-mode interference device further comprises a multi-mode interference section that receives an output via the propagation section exit, and wherein the multi-mode interference section is untapered.

11. The magnetic write apparatus of claim 1, wherein the multi-mode interference device further comprises an output section that receives an output from the propagation section, and wherein the output section is untapered.

12. A waveguide comprising:
a mode converter to receive energy from a light source and convert the energy from a first mode to a second mode;
a multi-mode interference device to receive the energy in the second mode from the mode converter and generate a plurality of outputs, wherein the multi-mode interference device comprises:
a propagation section;
a multi-mode interference section; and
an output section; and
an additional portion to receive at least a portion of the plurality of outputs from the multi-mode interference device and transmit an output energy outside the waveguide.

13. The waveguide of claim 12, wherein the propagation section comprises an entrance and an exit, and wherein the propagation section is one of tapered, untapered, and inversely tapered between the entrance and the exit.

14. The waveguide of claim 12, wherein the multi-mode interference section comprises an entrance and an exit, and wherein the multi-mode interference section is one of tapered, untapered, and inversely tapered between the entrance and the exit.

15. The waveguide of claim 12, wherein output section comprises an entrance and an exit, and wherein the output section is one of tapered, untapered, and inversely tapered between the entrance and the exit.

16. The waveguide of claim 12, wherein the propagation section transmits a first output portion and a second output portion, and wherein the first output portion is transmitted outside the waveguide to control the light source and the second output portion is transmitted to the multi-mode interference section of the waveguide.

17. The waveguide of claim 12, wherein the output section transmits a pair of outputs to the additional portion, and wherein the additional portion is an interferometric waveguide having a pair of arms to receive the pair of outputs.

18. The waveguide of claim 12, wherein the propagation section is inversely tapered, the multi-mode interference section is untapered, and the output section is untapered.

19. The waveguide of claim 12, wherein the propagation section is inversely tapered, the multi-mode interference section is tapered, and the output section is untapered.

20. An apparatus comprising:
  means for receiving energy from a light source and transforming the energy from a first mode to a second mode;
  means for receiving the energy in the second mode via an entrance that is narrower than an exit thereof and expanding the energy into multiple modes;
  means for receiving the multiple modes of the energy and causing interference between the multiple modes for obtaining an output; and
  means for receiving the output and directing the output to a near field transducer for heating a region of a magnetic media.

* * * * *